United States Patent
Galick

(10) Patent No.: US 7,912,717 B1
(45) Date of Patent: Mar. 22, 2011

(54) METHOD FOR UNCOVERING HIDDEN MARKOV MODELS

(76) Inventor: Albert Galick, Buffalo, NY (US)

( * ) Notice: Subject to any disclaimer, the term of this patent is extended or adjusted under 35 U.S.C. 154(b) by 850 days.

(21) Appl. No.: 11/282,410

(22) Filed: Nov. 18, 2005

Related U.S. Application Data

(60) Provisional application No. 60/629,114, filed on Nov. 18, 2004.

(51) Int. Cl.
*G10L 15/14* (2006.01)
*G10L 15/04* (2006.01)
*G06G 7/00* (2006.01)

(52) U.S. Cl. ............... 704/256; 704/256.1; 704/256.23; 704/256.5; 704/256.6; 704/251; 704/254; 704/255; 704/240; 706/20; 706/21

(58) Field of Classification Search .............. 704/256, 704/254, 255, 240, 251, 256.1, 256.3, 256.5, 704/256.6; 706/20, 21
See application file for complete search history.

(56) References Cited

U.S. PATENT DOCUMENTS

| | | | |
|---|---|---|---|
| 5,608,841 A * | 3/1997 | Tsuboka | 704/256 |
| 5,730,142 A | 3/1998 | Sun et al. | |
| 5,778,881 A | 7/1998 | Sun et al. | |
| 5,782,888 A | 7/1998 | Sun et al. | |
| 5,799,277 A * | 8/1998 | Takami | 704/256.4 |
| 6,212,510 B1 * | 4/2001 | Brand | 706/62 |
| 6,459,808 B1 | 10/2002 | Brand | |
| 7,007,001 B2 | 2/2006 | Oliver et al. | |
| 7,203,635 B2 * | 4/2007 | Oliver et al. | 703/22 |
| 7,343,284 B1 | 3/2008 | Gazor et al. | |
| 7,424,464 B2 | 9/2008 | Oliver et al. | |
| 7,433,820 B2 | 10/2008 | Garg et al. | |
| 7,480,615 B2 | 1/2009 | Attias et al. | |
| 2007/0067280 A1 * | 3/2007 | Zhou et al. | 707/5 |

OTHER PUBLICATIONS

Buchholz, P., 1999. "An adaptive aggregation/disaggregation algorithm for hierarchical Markovian models." European Journal of Operational Research 116 3, pp. 545-564.*
I. C. Paschalidis and S . Vassilaras. "Model-Based Estimation of Buffer Overflow Probabilities from Measurements." in Proceedings of ACM SIGMETRICS. Jun. 2001.*
Thomason,M.G.,Whittaker, J.A.:Rare failure-state in aMarkov chainmodel for software reliability. In: Proceedings of the 10th International Symposium on Software Reliability Engineering. IEEE, Boca Raton, (1999).*
P. Buchholz and P. Kemper. A toolbox for the analysis of discrete event dynamic systems. In N. Halbwachs and D. Peled, editors, Computer Aided Verification (CAV'99), pp. 483-486. Springer LNCS 1633, 1999.*

(Continued)

*Primary Examiner* — James S Wozniak
*Assistant Examiner* — Edgar Guerra-Erazo
(74) *Attorney, Agent, or Firm* — Hiscock & Barclay, LLP

(57) ABSTRACT

The invention uses the ModelGrower program to generate possible candidates from an original or aggregated model. An isomorphic reduction program operates on the candidates to identify and exclude isomorphic models. A Markov model evaluation and optimization program operates on the remaining non-isomorphic candidates. The candidates are optimized and the ones that most closely conform to the data are kept. The best optimized candidate of one stage becomes the starting candidate for the next stage where ModelGrower and the other programs operate on the optimized candidate to generate a new optimized candidate. The invention repeats the steps of growing, excluding isomorphs, evaluating and optimizing until such repetitions yield no significantly better results.

13 Claims, 8 Drawing Sheets

OTHER PUBLICATIONS

Bilmes et al., "The Graphical Models Toolkit: An open source software system for speech and time-series processing." Proc. IEEE Intl. Conf. on Acosutics, Speech and Signal Processing, 2002.*

J. Bilmes and C. Bartels, "On triangulating dynamic graphical models," in Uncertainty in Artificial Intelligence: Proceedings of the Nineteenth Conference (UAI-2003), pp. 47-56.*

Zhou, G. et al. (Jul. 2002). "Named Entity Recognition using an HMM-based Chunk Tagger," Proc. 40th Annua Meeting of the Association for Computation Linguistics, pp. 473-580.*

Saito, K. et al. (2003) "Multi-Language Named Entity Recognition System based on HMM," Proc ACL 2003 Workshop on Multilinglual and Mixed-language Named Entity Recognition pp. 41-48.*

Reibman et al., "Analysis of Stiff Markov Chains", ORSA Journal on Computing, vol. 1, No. 1, Spring 1989.*

F. Qin, L. Li, Model-based fitting of single-channel dwell-time distributions, Biophys. J. 87 (2004) 1657-1671.*

Messmer BT, Bunke H (1999) A decision tree approach to graph and subgraph isomorphism detection. Pattern Recogn 32:1979-1998.*

I. C. Paschalidis and S. Vassilaras. "Model-Based Estimation of Buffer Overflow Probabilities from Measurements." in Proceedings of ACM SIGMETRICS. Jun. 2001.*

P Buchholz and P. Kemper. A toolbox for the analysis of discrete event dynamic systems. In N. Halbwachs and D. Peled, editors, Computer Aided Verification (CAV'99), pp. 483-486. Springer LNCS 1633, 1999.*

Feng Qin "Maximum Likelihood Estimation of Aggregated Markov Processes", Proceedings: Biological Sciences, vol. 64, No. 1380 (Mar. 22, 1997), pp. 375-383.

William J. Bruno, Jin Yang, and John E. Pearson, "Using Independent Open-toClosed Transitions to Simplify Aggregated Markov Models of Ion Channel Gating Kinetics," Proceedings of the National Academy of Sciences, May 3, 2005, vol. 102, No. 18, 6326-6331.

F. Espinosa, G.A. Marks and R.H. Joho, "Severely Disordered Slee/Wake Cycle in KV3.1/KV3.3-Deficient Mice," Sleep. vol. 25, Abstract Supplement 2002, A411-A412, Sleep Research Society.

* cited by examiner

METHOD FOR UNCOVERING HIDDEN MARKOV MODELS

CROSS-REFERENCE TO RELATED APPLICATIONS

This application claims the benefit of the priority date of U.S. Provisional patent application Ser. No. 60/629,114 filed Nov. 18, 2004.

BACKGROUND OF THE INVENTION

The invention relates in general to modeling and in particular to generating hidden Markov models from state and transition data.

In U.S. Pat. No. 6,965,861, the inventors discuss Hidden Markov models (HMMs) as a class of statistical models used in modeling discrete time-series data. Problems that naturally give rise to such data include robot navigation, machine vision, and signal processing, and HMMs are at the core of many state-of-the-art algorithms for addressing these problems. In addition, many problems of natural language processing involve time-series data that may be modeled with HMMs, including: part-of-speech tagging, topic segmentation, speech recognition, generic entity recognition, and information extraction.

The U.S. Patent and Trademark Office database shows more than 1,200 hits for "hidden markov model" as of Nov. 15, 2005. HMM technology appears in numerous fields including and not limited to voice recognition, handwriting recognition, signal processing and genetic engineering. It is a fundamental tool for uncovering state systems within complex data sets of real world phenomena. However, many techniques for arriving at a HMM representative of such complex data are highly empirical. Thus, there is a need for improved methods to generate a HMM from such data sets, to test and/or change the complex systems in accordance with the HMM.

This invention arises from studies of mouse sleep stage data, iterating related art techniques originally designed for studying ion channels ("Maximum likelihood estimation of aggregated Markov processes" Proceedings of the Royal Society B, Vol. 264, No. 1380; pp. 375-383, Mar. 22, 1997). Extending prior art optimizing the parameters of a fixed graph, this invention presents a method to arrive at the "best" or most likely graphical model. This method is a data processing technique to identify hidden Markov model (HMM) state machines in physical, chemical, biological, physiological, social and economic systems. Unlike speech processing prior art, for example, this invention does not choose from a library of pre-determined left-to-right models, or any other library, but determines a new model from each new set of data.

A state machine is a concept that is used to describe a system that transitions from one state to another state and from there back to the original state or into other states, and so on. Dwell time is the time spent in any one state. Dwell times and transitions between states can be observed, but they are often aggregations that cannot be distinguished by limited or indirect observations. The observed state machine may include invisible transitions among indistinguishable states in the same class of aggregated states, or indistinguishable transitions between different members of two aggregated states. In a Markov system, transitions are instantaneous and random; the probability per time unit of a transition at a given time from one state to another ideally depends only on the rate of that transition and the state at that time, and not the history of the system. These transition rates allow otherwise identical states to be distinguished, in that states with different exit transition rates will generally have different dwell time distributions. Observations are made over a period known as an epoch, a frame or a sampling interval, and for each of these a class or aggregated state is assigned. The aggregated states thus can easily be distinguished in histograms of their observed dwell times. Until now, the aggregated transitions weren't in general so easy to distinguish. In fact, some ideal hidden Markov models are indistinguishable by their steady state statistics ("Using independent open-to-closed transitions to simplify aggregated Markov models of ion channel gating kinetics" PNAS 2005 102: 6326-6331, hereinafter "Pearson").

In reality, the most interesting systems have external inputs, are out of equilibrium, do not have constant transition rates, or are otherwise fundamentally not steady-state, and thus not subject to Pearson's canonical equivalence. For such real systems, graph isomorphism is the only organizing principle; the nonphysical, negative transition rates of Pearson's tortured canonical forms are fortunately avoided, and there isn't much ambiguity in distinguishing models by how they fit real data. This invention identifies "best" hidden Markov models up to isomorphism, i.e., up to a relabeling of the graph that preserves adjacency.

Physiological and biological processes often resemble state machines. For example, the sleep cycle of mice include states identified as rapid eye movement (REM) sleep, slow wave sleep and awake. These three states are readily identified in EEG polysomnography studies and, at first glance, a simple 3 state machine emerges with transitions between all states (except you don't see transitions directly from awake to REM sleep). The transitions occur randomly without apparent outside stimulus and so the state machine can be considered a Markov system. However, histograms of the 3 observed state dwell times indicate that there are multiple hidden states for each of the observed states. How to connect these 6 or more hidden states with hidden transitions is not at all clear and in fact the number of possible connected graphical models increases combinatorically with the number of states and transitions. The hidden Markov model has states and transitions that are not readily apparent from the data but nevertheless are real components of the system that is represented by the Markov model. By uncovering the hidden Markov model, investigators learn more about the underlying processes and are better able to explain the phenomena of studied physical, chemical, biological, physiological, social and economic systems and craft experiments to measure how variables will affect the systems.

Markov models allow the observer to make predictions about possible results if the system is activated in different ways. For example, data from a control Markov system may be compared with data from an experimental Markov system to see if the variables between the control and experimental systems generate changes on the system level, i.e., do they create different states and different transitions between states. Comparing control and experimental Markov systems gives more information about not only the gross differences between the control and experimental system but also the way in which those differences are manifested in the operation of the system. In our analysis of very limited mouse sleep data, for example, we discover plausible wild-type mouse sleep cycles, and that the double knock-out mice have dramatic changes in their sleep models, a result that could not be determined by gross observation of single knock-out mice (see Joho).

Complex systems can be defined by Markov models, but it is difficult to identify the model when there are hidden states. Investigators searching for hidden Markov models often use empirical methods to identify hidden Markov models. However, complex systems will often have a combinatorically increasing number of possible Markov models. In order to evaluate potential hidden Markov models, one must contrast numerous Markov models with every conceivable hidden state and transition between states. For example, for a mouse sleep model with up to 16 degrees of freedom (i.e., up to 8 transitions), the candidate models include all connected graphs of up to 8 edges and up to 9 states from 3 distinct observable classes (colors). There are 762,291 such distinct (nonisomorphic) graphs.

SUMMARY

This invention overcomes the problem of the prior art and allows investigators to find hidden Markov models by following a set of rules. The rules exploit and follow the data in a given data set so that the investigator performs a series of repeated steps that lead to a "best" (e.g., most likely) hidden Markov model at each iteration. At the end of each iteration of the rules of the steps, the best candidate model(s) have been stored, and their score (e.g., likelihood) is compared with that of the next best candidate model(s). If the difference in scores is significant, then the additional complexity of the best candidate(s) is justified. This invention is based on a combination of statistical probability and Markov model structures, their construction and their modification that is driven by data under examination. The invention identifies isomorphic (identical or redundant) models and analyzes only one isomorphic model during an iteration of the steps.

The rules allow for some variation in their application—at the outset, with the choice of initial model, and along the way, and if problems are encountered. The rules are robust, in that the same result is usually obtained by different applications of the rules (e.g., different choices of equally "best" candidates along the way, or different choices of starting model).

With the invention investigators may more rapidly distinguish test data from new products in a system. By knowing the hidden Markov model of a physiological system under different drug regimens, scientists are enabled to find drugs that affect the system in a specific state and that maximize the beneficial effect of the drug, and thereby elucidate both the pharmacopeia and the physiological system itself.

DETAILED DESCRIPTION

Figure 1:
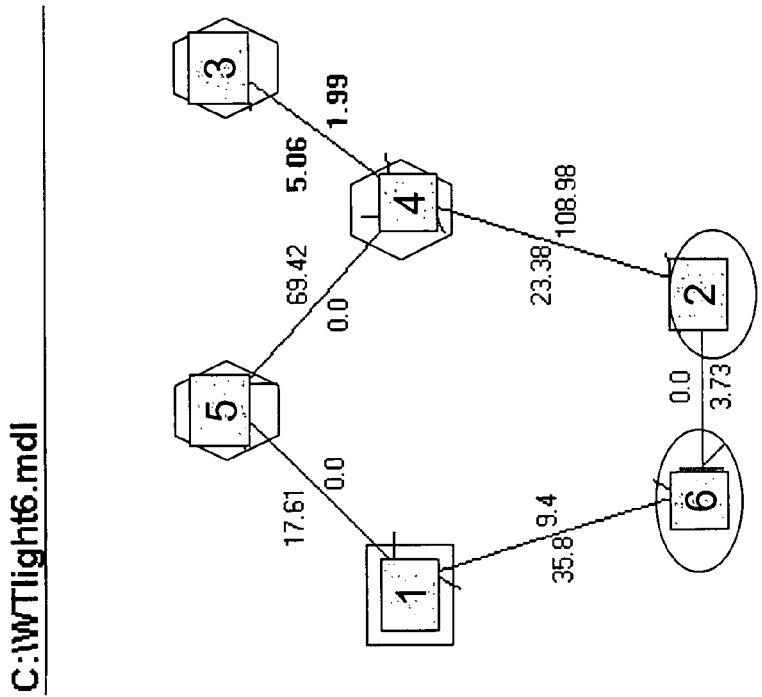
FIG. 1 shows a sleep cycle for wild mice in the dark.

For any Markov process P, and any optimization method for the transition rates of a Markov model M that maximizes the likelihood that observations of P came from M, we claim that this invention constructs the model M* with the graph most likely to have generated those observations, and that with sufficient observational data, M*=P in many cases.

For this demonstration, we use the optimization methods and I/O available in the software package QUB, available for download at http://www.qub.buffalo.edu. This invention is embodied by 1) ModelGrower.py, a Python script that runs in a convenient interface provided by QUB. A copy of the source code for this program is appended to this patent.
2) geng.exe, allpermg.exe, shortg.exe, and listm.exe in the NAUTY22 directory, and associated extensions/modifications, straightforward to someone skilled in the art, of Brendan McKay's open source software package NAUTY to properly handle color partitions, the original having been obtained online, used for counting and eliminating isomorphic duplicates of graphs underlying the Markov models, and
3) checklist, countgraphs, and countgraphsjob in the NAUTY22 directory, and countjob.bat and countjobs.bat in the cygwin directory; all connecting scripts to call programs 2) from 1).

A cygwin environment is needed to compile 2) and run 3) on a PC. A convenient setup tool for a cygwin environment is available at http://www.cygwin.com.

Maximum Likelihood Methods have long been used to fit transition rates of hypothetical Hidden Markov Models to observational data. It has been a weakness of these methods that they can only optimize a few parameters in an otherwise rigid model. This invention provides one way to let the data tell us what the model should be, namely what the most likely underlying graph is, without any a priori assumptions.

The current state of the art is that the graph must be known, surmised, or found by trial and error from a number of possible graphs that grows combinatorially with the number of nodes and edges allowed. If unobserved transitions to indistinguishable states, i.e., hidden edges and nodes, are allowed, then there is no limit on the number of possible nodes and edges. Obviously, hidden nodes and edges correspond exactly to the subtle phenomena we would like to infer from observational data.

This invention solves this problem by letting the data tell us what the most likely addition to the model should be. We view the model as a discretization of a potential energy hypersurface, in which each state is a local minimum and each transition represents all possible ways of overcoming energy barriers to transition from one local minimum to another. This analogy motivates the method but does not necessarily restrict it. For example, we have used the method for modeling sleep cycles, for which there is no obvious definition of potential energy, and which are clearly out of equilibrium (due to the irreversible direction of the cycles). In fact, there is an advantage to using the method on data from non-equilibrium, irreversible, or otherwise non-ideal systems, in that the number of degenerate models of indistinguishable likelihood expected by Pearson for steady-state systems, are greatly reduced at each stage of model growth.

We start from the simplest model that explains the observational data (often simply a 2-state model with one transition). This starting model may be an oversimplification for this data if hidden states and transitions are coalesced. Now, adding one transition in all possible ways, optimizing each of them, and choosing the one with the highest log likelihood ("bestLL"), corresponds to finding the next most likely degrees of freedom to add to the model. More specifically, using the transition rates of the current model as initial conditions, along with reasonable guesses for the two new rates, we add a new transition in all possible ways: 1) between existing states, or 2) between split states with existing connections reallocated in all possible ways. This is the natural way to relax a discrete model of a potential energy surface in all possible ways into a model with more degrees of freedom. Because the starting model is a coalesced submodel of each new initial model, each of which has two added degrees of freedom, it is a fair comparison to choose the model optimized from these new initial models that attains the highest likelihood. If none of the new models attains significantly higher log likelihood (i.e., if "deltaLL" is small), the data doesn't justify added degrees of freedom. Thus, we have our stopping criterion for the algorithm, and a built-in Akaike information criterion for selecting the simplest model.

Notice also that, by using the optimized rates as initial conditions in each next larger trial model, we are letting the data tell us how to best grow the graph. This quickly eliminates all of the bad graphs from consideration. In one example of this demonstration, DKOlight8, a mouse sleep model with a connected graph of 8 edges, the number of candidate graphs with no more degrees of freedom consists of all connected graphs of up to 8 edges and up to 9 states from 3 distinct observable classes (colors). There are 762,291 such distinct (nonisomorphic) models as follows (computed by script NAUTY22/countgraphsjob):

| partition | partition colorings | labeled graphs (connected, <9 edges) | total distinct graphs (connected, <9 edges) |
|---|---|---|---|
| 123 | 1 | 4 | 4 |
| 1123 | 3 | 23 | 69 |
| 11123 | 3 | 157 | 471 |
| 11223 | 3 | 224 | 672 |
| 111123 | 3 | 929 | 2787 |
| 111223 | 6 | 1709 | 10254 |
| 112233 | 1 | 2486 | 2486 |
| 1111123 | 3 | 2754 | 8262 |
| 1111223 | 6 | 6302 | 37812 |
| 1112223 | 3 | 8139 | 24417 |
| 1112233 | 3 | 11877 | 35631 |
| 11111123 | 3 | 3596 | 10788 |
| 11111223 | 6 | 9607 | 57642 |
| 11112223 | 6 | 15147 | 90882 |
| 11112233 | 3 | 22134 | 66402 |
| 11122233 | 3 | 28656 | 85968 |
| 111111123 | 3 | 1747 | 5241 |
| 111111223 | 6 | 5204 | 31224 |
| 111112223 | 6 | 9480 | 56880 |
| 111112233 | 3 | 13820 | 41460 |
| 111122223 | 3 | 11513 | 34539 |
| 111122233 | 6 | 21715 | 130290 |
| 111222333 | 1 | 28110 | 28110 |
| Total | | | 762291 |

However, in order to extract this model from data, only 368 models needed to be optimized for their transition rates, and up to 88 at a time of these could have been done in parallel (at the sixth growth stage). This total count of 368 includes 91 models optimized at the seventh growth stage, none of which turned out to be justified.

The data presented below relies upon two sets of mice. One set includes ordinary or so-called wild type mice that have had no genetic alterations. The other set include mice that have been genetically altered to remove two genes. The latter is set is called double knock out (DKO) mice. Note that we calculated the extent of our universe of 762,291 possible graphs from the number of transition rates (i.e., degrees of freedom) found in the DKOlight8 model and its data, allowing a maximum connected graph order of 9, but nothing in the algorithm depended on knowing this limit. Finally, this algorithm is robust because there will be many ways to grow the graph to the final best one, in case one growth progression runs into some difficulty.

Application to Sleep State Modeling

We have obtained mouse sleep state observations from Rolf Joho at U. Texas Southwestern Medical Center, Dallas, Tex. These EEG-based data are spectrally assigned sleep state observations for 24 hours on a 12/12 light/dark cycle for 13 individual wild-type (WT) and 13 individual Kv3.1/Kv3.3 double knock-out (DKO) mice (see files MouseSleepKineticsWT.dwt and MouseSleepKineticsDKO.dwt and the corresponding light and dark selection lists). Each 15 second observational interval is assigned code 1=REM sleep (black, square), 2=slow wave sleep or SWS (red, circle), or 3=waking (blue, hexagon). Profound differences in the sleep/wake cycle of DKO mice from that of WT mice have been observed, as have differences during light and dark periods (see "Severely Disordered Sleep/Wake Cycle in KV3.1/KV3.3-Deficient Mice", F. Espinosa, G. A. Marks, & R. H. Joho, Abstract 580.A in SLEEP, Vol. 25, Abstract Supplement 2002, pp. A411-412, herein "Joho").

Figure 2:
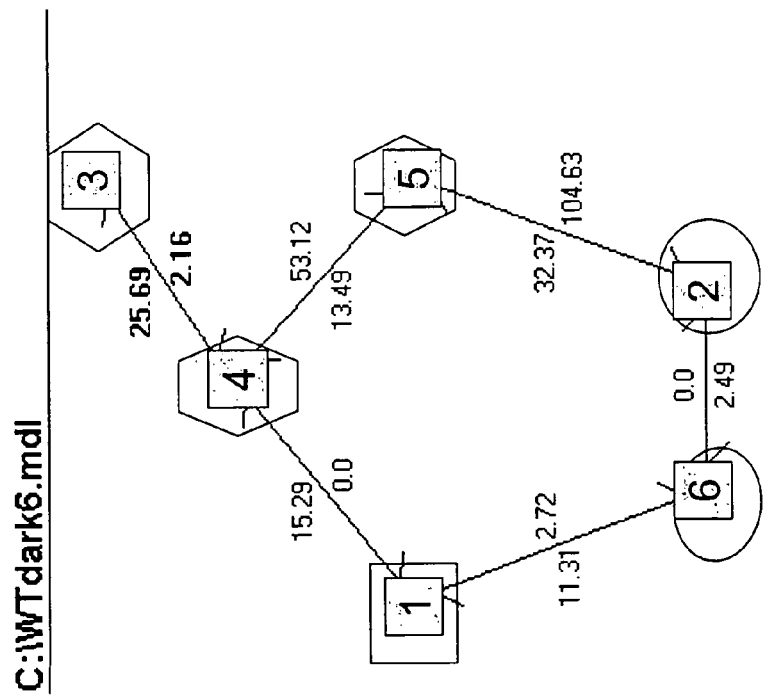
FIG. 2 shows a sleep cycle for wild mice in light.
Figure 4:
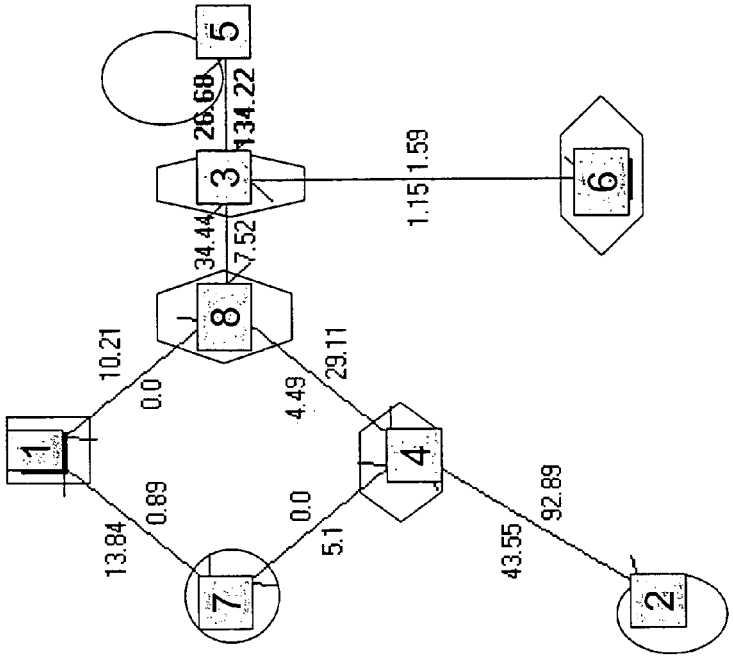
FIG. 4 shows a sleep cycle for genetically altered mice in light.
Figure 3:
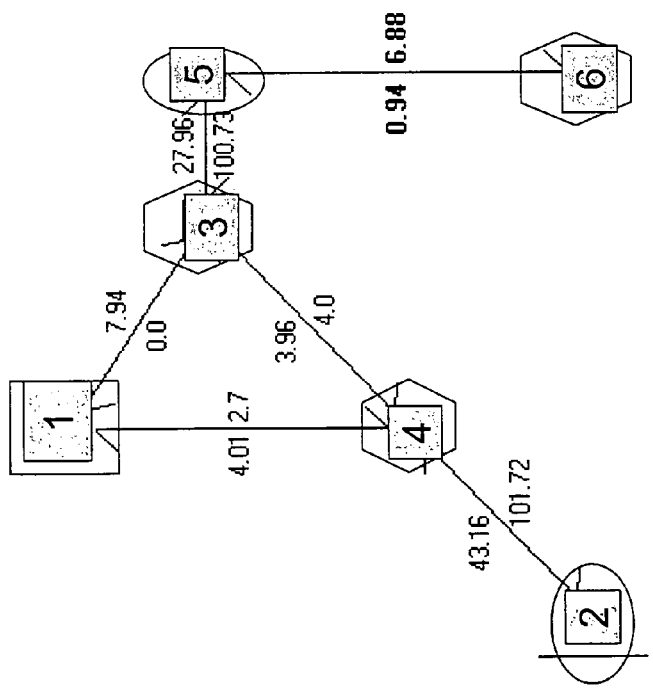
FIG. 3 shows a sleep cycle for genetically altered mice in the dark.

This invention provides a tool to characterize the physiology of these differences in explicit detail, as is already apparent in the models we develop. For example, the wild-type mouse sleep cycles for light and dark are very similar, differing mainly in the kinetics of waking states where the sleep cycle is entered and exited (the numbering of the states shows only the order of their addition to the model—the states of each color are indistinguishable aggregated states) as shown in FIGS. 1 and 2. These represent the HMMs for the most likely candidate after seven steps on the wild type dark data (to WTdark9) and five steps on the wild type light data (to WTlight7), respectively. On the other hand, the double knockout mice have radically different sleep models from the wild-type and even from dark to light as shown in FIGS. 3 and 4. They represent the HMMs for the most likely candidate after six steps on the DKO dark data (to DKOdark8) and seven steps on the DKO light data (to DKOlight9), respectively.

Figure 5:
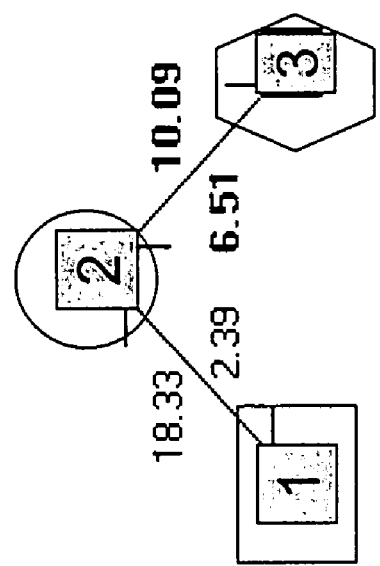
FIG. 5 shows an initial model for uncovering a Hidden Markov Model.

The four HMMs of FIGS. 1-4 were developed or grown from the aggregated state model shown in FIG. 5. Each of the four data sets has the same starting model as FIG. 5. The basic model of FIG. 5 was then evolved using the rules of the invention to arrive at the final models shown in FIGS. 1-4. The results of the invention show that each of the four sets of data has different HMMs. The wild type dark and light are similar to each other. However, the DKO dark and light are different from each other and from the corresponding wild type data for dark and light. Thus, the invention can readily distinguish between wild type and DKO sleep patterns. While existing methods could not distinguish differences without double knockouts, it seems likely that each single knockout would have caused changes in the sleep cycle that this method would have found, thus elucidating the function of the knocked-out KV3.1/KV3.3 potassium channels.

The invention is performed by operating one or more programs on a computer. In order to follow the steps of the invention, the following notes are provided.

Installation Notes:

1) The default cygwin installation must be modified to include tcsh in addition to the standard bash shell. The scripts are written for the more flexible tcsh command environment.

2) Paths in ModelGrower.py, countjob.bat, and echo.bat files must point to the correct partition (Search for [c-f]:)

3) The NAUTY22 directory need not be recompiled.

4) ModelGrower.py should replace ModelBuilder.py in the PythonScripts directory.

Execution Notes:

1) We interpret seconds as milliseconds so the time scale corresponds roughly to that of ion channel kinetics, for which QUB was designed. Hence the transition rates in the optimized models are per 1000 seconds.

2) We use dead time=data sampling delta t (15 msec for the mouse sleep data

3) Before idealization, we had to change the default "ion channel current amplitudes" in the model to 1 for black, 2 for red, and 3 for blue to correspond to the sleep state codes. The default values were integers starting from 0 (for closed). This change is reflected in the .dwt (dwell time) files.

4) Graphs whose optimizations fail are unlikely candidates, so just "OK" out of the (many) error box messages and let the script continue on the next graph candidate.

5) Optimization is accomplished using the QUB program referenced above or any other suitable Markov optimization program available to those skilled in the art. QUB and other such programs optimize models by finding only a local optimum, implying that the method may not find the best or next best models, raising doubt about the graph identified and the stopping criterion. To assuage these doubts, the optimization may be run with the "Yes" box checked on "do Hypercube of starting rates:" This option causes four optimizations to be done on each model, starting from the four corners of a square region defining the 2 starting rates of the new transition. This is a much more economical choice than using starting rates from the corners of a hypercube around all the starting rates. This option only occasionally changes the best or next best models at any stage.

6) Another obvious but expensive way of guaranteeing optimality of the identified graph would be to optimize isomorphic models arrived at by reallocating existing connections in different ways. This capability was not implemented because it would redo many problematical graph optimizations.

7) Occasionally QUB may crash on a particular model optimization, taking the ModelGrower script down with it. The pathological model can be avoided by restarting the script with different default starting rates, "No" vs. "Yes" on "do Hypercube of starting rates:", different cube radius, etc. Just be sure to remove the lists of tried models in the NAUTY22 directory (filenames "[0-9].*") so that the optimization does not skip them all! We have found that QUB may allow one or more unhandled floating-point exceptions that come from histogram plotting steps that are not essential to finding HMMs. We recommend either disabling non-essential histogram plotting or rewriting QUB to handle the floating-point exceptions.

8) The most reasonable default starting value for new rates is probably an average of the existing, optimized rates, but we leave this setting to the user (right-click on a rate in the QUB model window). Slower starting rates seem to work better.

SUMMARY OF MOUSE SLEEP MODEL GROWTH

| distinct graphs optimized | growth step | bestLL | nextbestLL | deltaLL | bestLL (no hypercube) | nextbestLL (no hypercube) | deltaLL (no hypercube) |
| --- | --- | --- | --- | --- | --- | --- | --- |
| 15 | WTdark2->3 | 4823.34 | 4721.55 | 101.79 | | | |
| 44 | WTdark3->4 | 5019.39 | 4876.54 | 142.85 | | | |
| 79 | WTdark4->5 | 5107.79 | 5099.2 | 8.59 | 5099.2 | | |
| 124 | WTdark5->6 | 5198.84 | 5167.58 | 31.26 | | 5163.06 | 35.78 |
| 180 | WTdark6->7 | 5246.56 | 5241.4 | 5.16 | | 5240.86 | 5.7 |
| 248 | WTdark7->8 | 5288.3 | 5285.54 | 2.76 | | | |
| 334 | WTdark8->9 | 5327.72 | 5326.08 | 1.64 | 5326.08 | 5324.8 | 1.28 |
| 15 | WTlight2->3 | 7645.08 | 7537.08 | 108 | | | |
| 44 | WTlight3->4 | 8139.38 | 7840.4 | 298.98 | | | |
| 79 | WTlight4->5 | 8271.46 | 8239.69 | 31.77 | | 8221.23 | 50.23 |
| 124 | WTlight5->6 | hypercube leads to QUB crash | | | 8462 | 8440 | 22 |
| 180 | WTlight6->7 | 8638.17 | 8637.29 | 0.88 | | | |
| 15 | DKOdark2->3 | 8010.69 | 7981.12 | 29.57 | | | |
| 44 | DKOdark3->4 | 8398.66 | 8363.16 | 35.5 | | 8135.91 | 262.75 |
| 83 | DKOdark4->5 | 8599.37 | 8596.92 | 2.45 | | | |
| 133 | DKOdark5->6 | 8735.25 | 8716.15 | 19.1 | | 8700.23 | 35.02 |
| 194 | DKOdark6->7 | 8814.1 | 8812.57 | 1.53 | | 8756.8 | 57.3 |
| 267 | DKOdark7->8 | 8924.24 | 8905.92 | 18.32 | 8904.79 | 8902.77 | 2.02 |
| 15 | DKOlight2->3 | 8122.17 | 8057.96 | 64.21 | | | |
| 44 | DKOlight3->4 | 8458.65 | 8388.1 | 70.55 | | 8298.84 | 159.81 |
| 83 | DKOlight4->5 (loop closes) | 8634.95 | 8634.78 | 0.17 | | 8622.64 | 12.31 |
| 113 | DKOlight5->6 | 8843.18 | 8761.87 | 81.31 | | | |
| 189 | DKOlight6->7 | 8987.2 | 8956.44 | 30.76 | | 8882.61 | 104.59 |
| 277 | DKOlight7->8 | 9072.15 | 9058.85 | 13.3 | | 9054.1 | 18.05 |
| 368 | DKOlight8->9 | 9107.09 | 9105.03 | 2.06 | | | |

The above data show four sets of iterations of the HMM algorithm of the invention. The "distinct graphs optimized" indicates the number of non-isomorphic states provided by the invention after the total number of possible states is reduced by the NAUTY program. For example, after the first step in the first data set, there are 15 candidates that are non-isomorphic (i.e., unique and different from each other) and each of those is evaluated by QUB for its likelihood before the graph is taken through the next step. Only the most likely candidate of the first step is operated on in the second step. It will generate 44 isomorphs for QUB evaluation.

The first set of data passes through seven steps before reaching a final step where further improvement is not likely. Each set of data is processed with and without a hypercube. The log likelihood (LL) of each member of each step is provided by the QUB program. Only the best and next best are shown in the above table. The data is tested with and without hypercubes of starting values. A blank cell under the non-hypercube column indicates the results for the non-hypercube are the same as the results for the hypercube. When results are different, the results are shown in the non-hypercube column. The delta LL shows the differences between the best one of the distinct graphs and the next best one for each step of graphs. The first two sets of data reach diminishing returns and this is shown by their respective delta LLs reducing to 1.64 and 0.88, respectively. For each, after there is little improvement in likelihood, the best graph of the last set is selected as the most likely HMM (at the fourth steps, in these cases).

Observations on the Above Data:

1) The likelihoods are infinitesimal and so their logs would be negative, but QUB translates the log likelihoods by a constant to make them positive.

2) The loop closing from DKOlight4→5 identified an irreversible (zero rate) transition, which in some sense was not an additional degree of freedom, and therefore the small deltaLL (0.17) was accepted on the grounds that this model suffered an unfair comparison with the others at this stage.

3) The large deltaLL (18.32) for the growth from DKOdark7→8 was discounted as unreliable, having followed two small deltaLL's at stages DKOdark4→5 and DKOdark6→7, which might have put the growth process off track.

4) These models are only that which is justified by the data—much more complicated sleep models are conceivable with more data. Larger models make the method even more powerful, as the number of possible models increases combinatorically (to 6,003,931 distinct models if we simply allow a maximum of 9 instead of 8 edges).

Detail of One Mouse Sleep Model Growth Step

For the wild-type mouse sleep data in the dark, we start with a model that describes most of the observable state transitions as shown in FIG. 5. While FIG. 5 is labeled for wild type dark, each of the other data sets has the same starting model for observed states. The observed states are considered aggregated states that may hide other less visible states. In the first instance, the observed or aggregated states include REM state 1 assigned the color black and indicated as a square in the figures, Slow Wave State 2 assigned the color red and designated by an oval, and the waking state 3 assigned the color blue and designated by a hexagon. Note that we could have included a transition between REM state 1 and waking state 3, but there are actually no transitions from waking to REM in the data, so we chose not to include this transition in either direction at this stage.

The invention uses the ModelGrower program to generate possible candidates from an original or aggregated model. The NAUTY program operates on the candidates to identify and exclude isomorphic models. The QUB program then operates on the remaining non-isomorphic candidates to identify the candidate that most closely conforms to the data by optimizing rates of that candidate (e.g., maximizing the likelihood that the data came from the model with those rates). The optimized candidate of the first stage is the starting candidate for the next stage where ModelGrower, NAUTY and QUB operate again. The invention terminates at an end point defined by the user, preferably an end point with threshold determined by diminishing delta LL.

The ModelGrower program performs the process of growing the basic model to candidate models that are representative of all possible models with one more transition. The ModelGrower program starts with the basic observed model of FIG. 5 and grows it by splitting states or connecting original unconnected states. Of all the possible enhancements of the model of FIG. 5, NAUTY reduces the number of candidates to 15 non-isomorphic candidates with one additional transition. QUB then examines the 15 candidates and ModelGrower selects the one candidate that most closely conforms to the data. The best candidate of stage 1 becomes the new starting point for stage 2 and it is examined for hidden states and hidden transitions. More specifically, the program ModelGrower grows the candidate in all possible ways by first splitting existing (aggregated) states into two states of the same color. NAUTY removes isomorphs. Then ModelGrower splits each state into two states where one split state is the same color as the original state and the other split state is a different color. The number of colors corresponds to the initial number of observed, aggregated states. NAUTY operates on those states to remove isomorphs. Finally, ModelGrower connects all unconnected states and NAUTY operates once more. At the end of the first stage, there are 15 candidates. QUB evaluates the 15 candidates by optimizing them, and ModelGrower identifies the best one of the candidates. The optimized candidate then becomes the starting candidate for stage 2 where the candidate is again grown by ModelGrower into more candidates, those candidates are examined for isomorphs by NAUTY to reduce the large number of possible combinations to 44 and those 44 candidates are optimized by QUB. The process is repeated seven times until one reaches an end point. One may set the end point at any suitable threshold. For the wild type dark data the end point was selected where the next delta LL was 5.16. That indicates the improvement in data for the model is minor.

Figure 6:
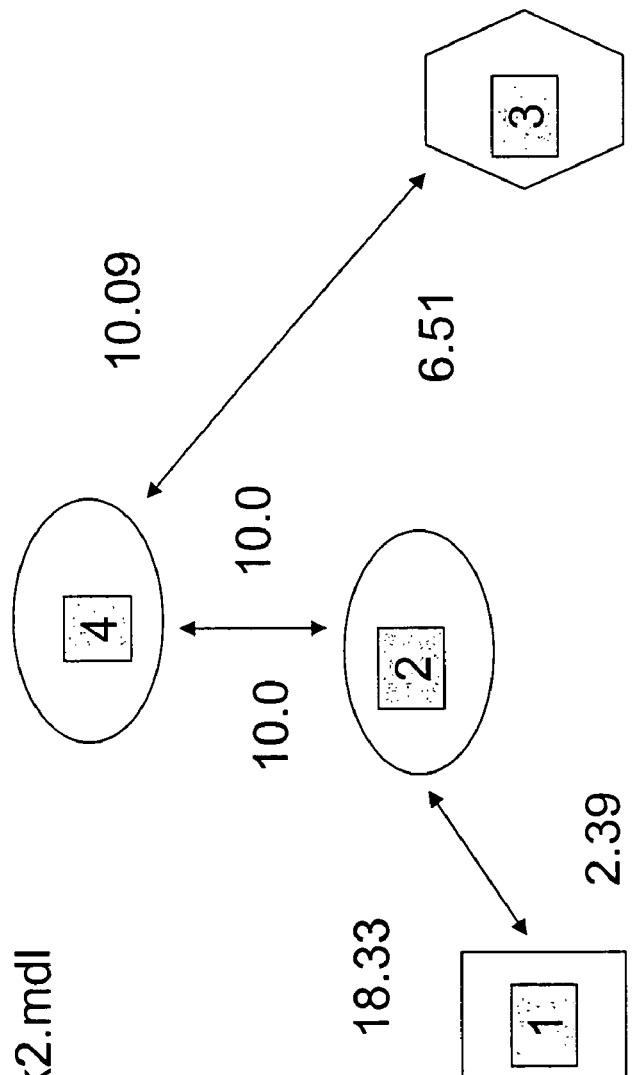
FIG. 6 is one way of adding a new transition.
Figure 7:
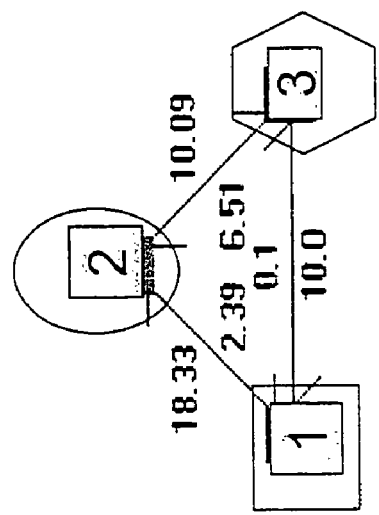
FIG. 7 is another way of adding a new transition.

FIGS. 6 and 7 exemplify two ways of adding a new transition. FIG. 6 shows how a prior state 2 colored red (oval) may be separated into another state 4, of the same color (red, oval) and into a new state 2 of the same color (red, oval). FIG. 7 shows how a transition is added between prior state 3, blue (hexagon) and state 1, black (square).

These working models based on the WTdark2 model haven't been named or saved so they retain the working name of the starting model, WTdark2. The model of FIG. 6 shows SWS state 2 having SWS state 4 split from it with a new transition, while one of its existing transitions (the one with waking state 3) is allocated to the new SWS state 4. Note that state 4 could have been the color of any sleep state, and could have been allocated any subset (or none) of the existing transitions of SWS state 2. The other model in FIG. 7 shows existing REM state 1 and waking state 3 connected by a new transition. The method of adding a transition in the FIG. 6 model reverses a graph contraction by which a model with indistinguishable (aggregated) states may have been coalesced, and the method in model of FIG. 7 adds a transition that may have been omitted. In this way, any correct model of aggregated states can be recovered in stages from the simplest model that accounts for all the observable transitions.

The starting rates between states 2 and 4 in FIG. 6 and between states 1 and 3 in FIG. 7 for these new transitions come from two corners of a hypercube (square) of multiplicative radius 10, namely (10,10) and (0.1, 10), centered around the default starting rate which in this case was 1.0. FIGS. 6 and 7 are just two of the 15 possible non-isomorphic evolutions of the primary or original aggregated model of FIG. 5. These starting rates are exemplary and other starting rates may be used. Note that all other transition rates have been retained as starting values for the optimization by QUB of these working models.

Figure 9:
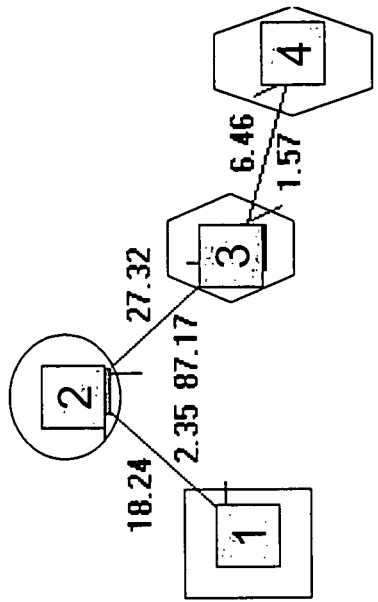
FIG. 9 is an optimized model derived from the starting guess of FIG. 8 that achieves the next best status.
Figure 8:
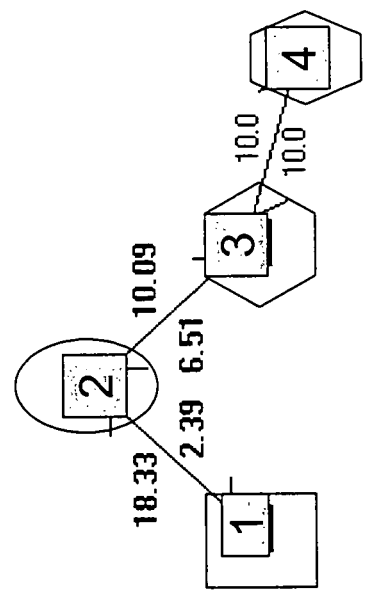
FIG. 8 is a starting guess that achieves the next best status.

15 non-isomorphic graphs are built in this way as starting guesses for optimization by QUB to find the next biggest model. Those 15 models are optimized by QUB and Model-Grower selects the best one of the 15 initial models and that model becomes the new model for the next iteration of the invention. The starting guess for step 2 and the optimized model in step 2 that achieves nextbestLL=4721.55 are shown in FIGS. 8 and 9, respectively.

Figure 11:
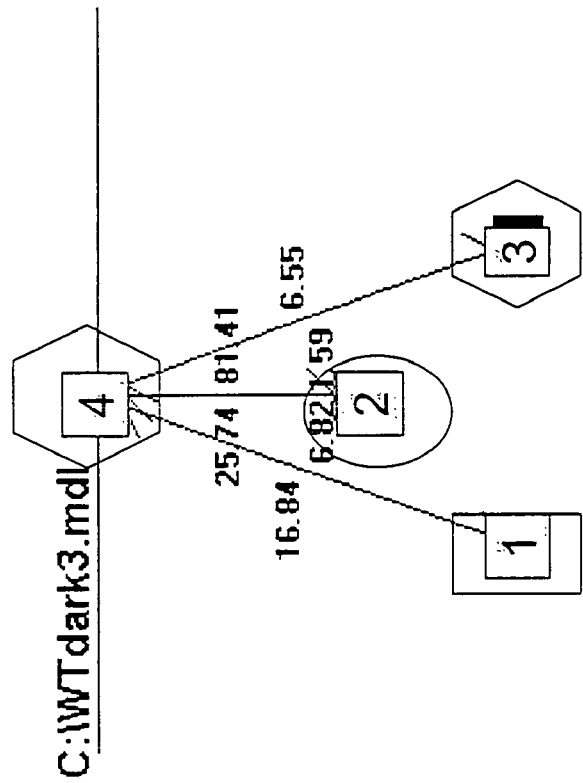
FIG. 11 is an optimized model derived from the starting guess of FIG. 10 that achieves the best status.
Figure 10:
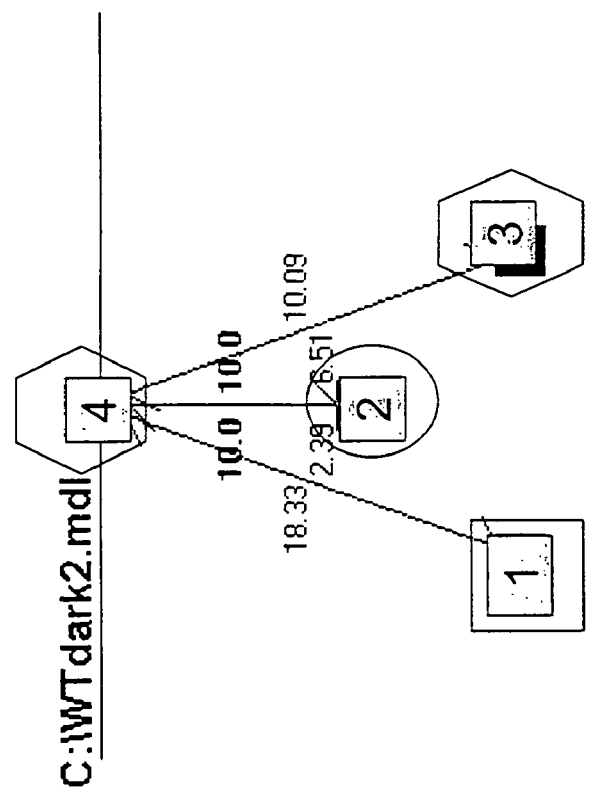
FIG. 10 is a starting guess for the optimization that achieves the best status.

The starting guess for step 3 and the optimized model that achieves bestLL=4823.34, are shown in FIGS. 10 and 11 respectively; the best model, with deltaLL=101.79, is accepted, saved, and labeled as FIG. 11.

Figure 13:
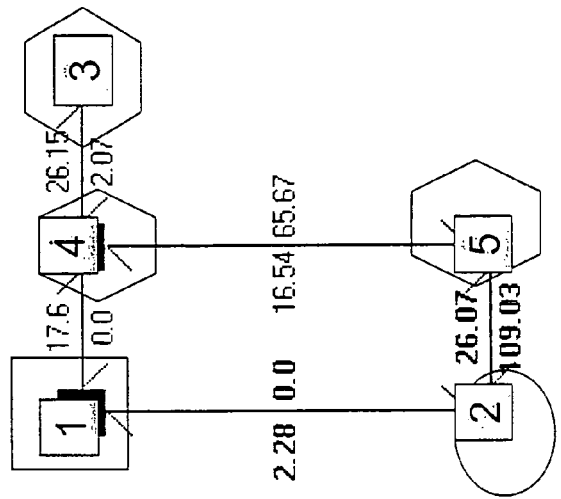
FIGS. 12 and 13 show the next two steps of growth.
Figure 12:
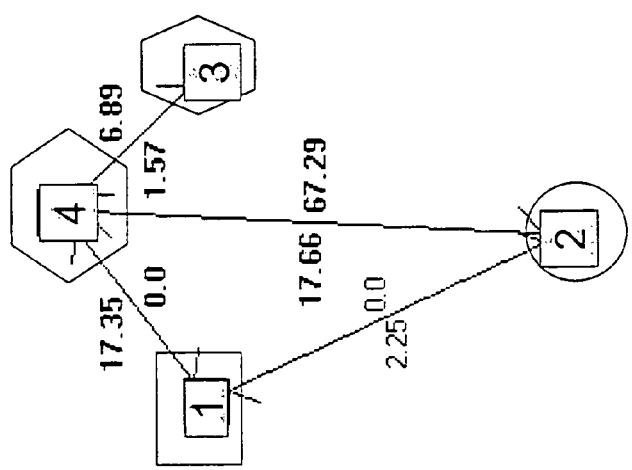

The next two steps of growth, with deltaLL=142.85 from WTdark3→4 and deltaLL=8.59 from WTdark4→5, are FIGS. 12 and 13.

The best or optimized model of in each step is used to generate the models of the next step. Those models have their isomorphs removed by NAUTY and the non-isomorphs are optimized with QUB so ModelGrower may select the best model for the next step. The foregoing process is repeated until there is little or no improvement. The invention operated seven times for wild type dark, five times for the wild type light, six times for the DKO dark and seven times for the DKO light. The final, optimized models are shown in FIGS. 1-4.

The attached Appendices provide detailed steps for operating their respective programs. The QUB and NAUTY programs are available for use with the invention and they are hereby incorporated by reference. Data and other disclosure in the references discussed above are also incorporated by references.

In summary, the invention uncovers HMMs by assuming that simplistic observed data includes one or more hidden states or hidden transitions between states. The invention may be used to generate HMM from complex data, especially data representative of biological processes. The invention provides valuable tools and processes to investigate the structure and operation of such processes. There are numerous applications. One example is ion channel communication. Physiologists believe that ion channels in cells control intercellular and intracellular communication. However, the operation of those ion channels is very complex and little is known about them. Using the invention, one may uncover a HMM for ion channel operation. When the structure of the state machine is known, it may be possible to treat a disease by using one or more medicines, electrical potential or currents or physical perturbations to alter a state or a transition between states. For example, suppose a disease is characterized by an over abundance of an immune response and the body produces an excess of cytokines and that over production is harmful. By using the HMM is may be possible to uncover a key state or key transition that may be manipulated by chemical, electrical, mechanical or other means to alter the state or transition and thereby mute the response. Another example is the opposite case with HIV where the body is deficient in its immune response. Using the invention it may be possible to identify a hidden state or a hidden transition that can be manipulated to amplify the immune response.

What I claim is:

1. A method for operating a computer to decode a set of data representative of a state machine to estimate the most likely hidden states and transitions, including rates, between said hidden states of the state machine, comprising the steps of:

storing data representative of observations of the state machine including one or more observed states, transitions between observed states, and continuous state dwell times between observed state transitions;

assigning a different code to each observed state, said code representative of a unique characteristic of its observed state that distinguishes it from all other observed states;

identifying an initial, observed graph, having a set of observed states, each occurring uniquely, multiple occurrences being indistinguishable, and having a set of observed transitions between observed states, each likewise occurring uniquely, and including only observed exits and entries among observed states;

generating from the previous graph a set of derived graphs with one additional bidirectional transition in each and every possible instance, namely:

generating first derived graphs by converting an existing state in the previous graph into a connected pair of new states, wherein both new states have the code of the existing state, and reallocating in any possible way the existing transition(s) of the existing state among the pair of new states;

generating second derived graphs by converting an existing state in the previous graph into a connected pair of new states, wherein one new state has the code of the existing state and the other new state has a different code of another different observed state, and reallocating in any possible way the existing transition(s) of the existing state among the pair of new states; and generating third derived graphs by adding a new bidirectional transition in any possible way between existing states of the previous graph where there was no transition;

removing isomorphic graphs from said set of derived graphs;

using the computer to optimize the rates of all transitions of each remaining derived graph to maximize the likelihood that each of the resulting derived graphs generated the stored data; and inspecting the likelihood of said resulting derived graphs to identify the one(s) whose underlying derived graph most likely corresponds to the stored data, wherein each resulting derived graph includes at least one hidden state transition.

2. The method of claim 1 wherein the step of identifying an initial, observed graph, consists only of the set of observed states, each occurring uniquely, multiple occurrences being indistinguishable, and consisting of the set of observed transitions between the observed states, each likewise occurring uniquely, and including only observed exits and entries among the observed states.

3. The method of claim 2 wherein the codes are colors.

4. The method of claim 1 further comprising repeating the steps of claim 8 to find the best graph(s) until the margin of likelihood above the next most likely graph(s) indicates diminishing returns, the comparison of graphs always being done among graphs with the same number of transitions or degrees of freedom, in order to find the simplest possible graph(s) maximizing the likelihood of the observed data, whereby the method generates the best justified estimate of hidden states and transitions of the state machine.

5. The method of claim 4 further identifying a hidden Markov model from a set of observations, to be compared with another hidden Markov model so identified from a different set of observations.

6. A method for operating a computer to decode a set of data representative of a state machine to estimate the most likely hidden states and transitions including rates, between said hidden states for the state machine, comprising the steps of:
   storing data representative of the state machine over time including one or more states and transitions between states;
   assigning a different code to each state, said code representative of a unique characteristic of its state that distinguishes it from all other states;
   identifying an initial graph representative of the state machine, including only those states and transitions justified by experimental evidence; and
   generating from the previous graph a set of derived graphs wherein each derived graph emerges from one of a set of operations on the previous graph, said operations performed one way at a time and in all possible ways on only one state or one transition so that each operation results in a derived graph with only one change in the total number of transitions or degrees of freedom relative to the previous graph and the set of derived graphs include each and every possible instance of such single changes;
   removing isomorphic graphs from said set of derived graphs;
   using the computer to optimize the rates of all transitions of each remaining derived graph to maximize the likelihood that each of the resulting derived graphs generated the stored data; and
   inspecting the likelihood of said resulting derived graphs to identify the one(s) whose underlying derived graph most likely corresponds to the stored data wherein each resulting derived graph includes at least one hidden state transition.

7. The method of claim 6 wherein one of the possible instances of such changes includes operating on the previous graph to generate derived graphs one way at a time and in all possible ways by converting one of each existing state in the previous graph into a bidirectionally connected pair of new states, wherein
   1) both new states have the code of the existing state, and
   2) the existing transition(s) of the existing state have been reallocated one way at a time and in all possible ways among the pair of new states.

8. The method of claim 6 wherein one of the possible instances of such changes includes operating on the previous graph to generate derived graphs one way at a time and in all possible ways by converting one of each existing state in the previous graph into a bidirectionally connected pair of new states, wherein
   1) one new state has the code of the existing state and the other new state has a different code of another different observed state, and
   2) the existing transition(s) of the existing state have been reallocated one way at a time and in all possible ways among the pair of new states.

9. The method of claim 6 wherein one of the possible instances of such changes includes operating on the previous graph to generate derived graphs one at a time and in all possible ways by adding a single new bidirectional transition between existing states of the previous graph where there was no transition.

10. The method of claim 6 wherein the step of identifying an initial, observed graph, consists only of the set of observed states, each occurring uniquely, multiple occurrences being indistinguishable, and consisting of the set of observed transitions between the observed states, each likewise occurring uniquely, and including only observed exits and entries among the observed states.

11. The method of claim 10 wherein the codes are colors.

12. The method of claim 6 further comprising
   repeating the steps of claim 6 to find the best graph(s) until the margin of likelihood above the next most likely graph(s) indicates diminishing returns, the comparison of graphs always being done among graphs with the same number of transitions or degrees of freedom, in order to find the simplest possible graph(s) maximizing the likelihood of the observed data, whereby the method generates the best justified estimate of hidden states and transitions of the state machine.

13. The method of claim 12 further identifying a hidden Markov model from a set of observations, to be compared with another hidden Markov model so identified from a different set of observations.

* * * * *